Patented Oct. 19, 1948

2,451,737

UNITED STATES PATENT OFFICE 2,451,737

PROCESS FOR THE MANUFACTURE OF PENTAENES

Otto Isler, Basel, Switzerland, assignor to Hoffmann-La Roche Inc., Nutley, N. J., a corporation of New Jersey No Drawing. Application February 10, 1947, Serial No. 727,733. In Switzerland October 18, 1945

6 Claims. (Cl. 260—611)

This invention relates to the manufacture of pentaenes.

In co-pending application No. 703,483, filed October 16, 1946, a process for the manufacture of pentaenes has been described, which comprises condensing 4-(2′,6′,6′-trimethyl-cyclohexene-(1′)-yl)-2-methyl-butene-(2)-al(1) by a Grignard reaction with an ether of 1 hydroxy-3-methyl-pentene-(2)-yne-(4), adding 1 mol of hydrogen to the triple bond of the resulting ether of 1-hydroxy-3,7-dimethyl-6-hydroxy-9-trimethyl-cyclohexenyl-nonadiene-(2,7)-yne-(4) by catalytical partial hydrogenation, and heating the resulting ether of 1-hydroxy-3,7-dimethyl-6-hydroxy-9-trimethyl-cyclohexenyl-nonatriene-(2,4,7) with a small quantity of iodine, preferably in presence of an inert solvent.

It has now been found, according to the present invention, that vitamin A-active compounds can also be obtained by condensing 4-(2′,6′,6′-trimethyl-cyclohexene-(1′)-yl)-2-methyl-butene-(2)-al(1) by a Grignard reaction with an ether of 1-hydroxy-3-methyl-pentene-(2)-yne-(4), heating the resulting ether of 1-hydroxy-3,7-dimethyl-6-hydroxy-9-trimethyl-cyclohexenyl-nonadiene-(2,7)-yne-(4) with a small quantity of iodine, preferably in presence of an inert solvent, and then adding 1 mol of hydrogen to the triple bond by partial hydrogenation.

This synthesis with reversed reaction sequence proceeds according to the following formulae:

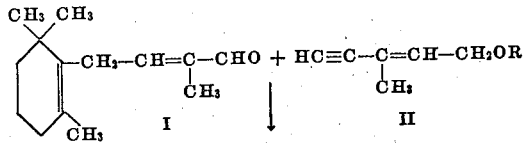

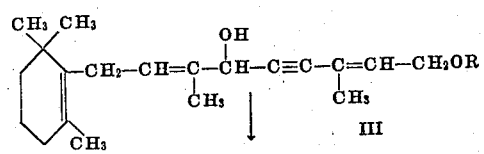

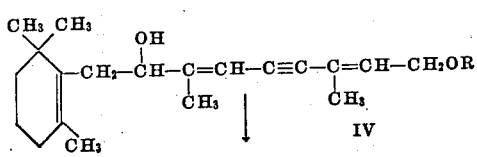

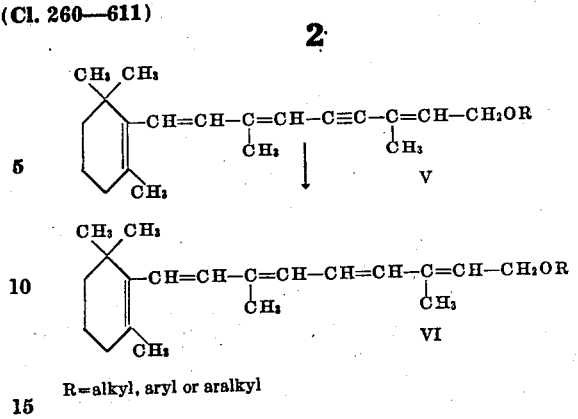

R=alkyl, aryl or aralkyl

The starting materials and the measures to be observed in connection with the various reaction steps are the same as those described in said co-pending case. In accordance with the present invention, the manufacture of the vitamin A-methyl ether may, for instance, be carried out as follows: 4-(2′,6′,6′-trimethyl-cyclohexene-(1′)-yl)-2-methyl-butene-(2)-al-(1) is condensed with 1-methoxy-3-methyl-pentene-(2)-yne-(4) with the aid of 1 mol of ethyl-magnesium-bromide. The resulting 1-methoxy-3,7-dimethyl-6-hydroxy-9-trimethyl-cyclohexenyl-nonadiene-(2,7)-yne-(4) is boiled with 1 to 2 per cent. iodine, suitably in presence of an inert solvent of boiling point 100° C. 1 mol of hydrogen is added to the triple bond of the resulting dehydration product by using a palladium catalyst on charcoal, on which quinoline has been adsorbed before use.

In accordance with the process described above, pentaenes (vitamin A-ethers) can be obtained which possess the same biological activity as vitamin A and its derivatives obtained from natural sources. The products of the process are characterised by causing a maximum of absorption in ultraviolet spectrum at 328 mµ and by the colour reactions with antimony trichloride, arsenic trichloride, aluminum silicate and trichloroacetic acid, specific to vitamin A.

The products of the process may be purified by the same methods as high concentrates of vitamin A and its derivatives from natural sources (separation between solvents, chromatographic adsorption, careful distillation, etc.). Like natural vitamin A, the products must be protected from the deteriorating effects of light, air and heat. It is advisable to add antioxidants; they may also be present during the different steps of the synthesis. Tocopherols are particularly suitable as antioxidants.

*Example 1*

13.5 parts by weight of 1-methoxy-3-methyl-pentene-(2)-yne-(4) in 30 parts by volume of ether are added during 1 hour while stirring in a nitrogen atmosphere to a solution of ethyl-magnesium-bromide, previously prepared from 3 parts by weight of magnesium and 14 parts by weight of ethyl-bromide in the presence of 30 parts by volume of ether. During the addition, the reaction solution must be kept slightly boiling. Thereafter, the mixture is refluxed for 4 hours. The resulting magnesium-bromide compound of the methyl-pentenyne is partly deposited as a gray smear. The mixture is left to cool and then a solution of 18 parts by weight of 4-(2',6',6'-trimethyl - cyclohexene - (1')-yl)-2-methyl-butene-(2)-al-(1) in 60 parts by volume of ether is added in the course of 1 hour. The temperature of the reaction mixture rises thereby and the deposit is dissolved. The solution is stirred overnight and then refluxed for 2 hours. Subsequently, it is diluted with ether, whereafter a 20 per cent. ammonium-nitrate solution is added while cooling. After washing with water and drying, the ether is boiled off. Parts of the aldehyde which have not taken part in the reaction are precipitated as phenylsemicarbazone by a methyl-alcoholic solution of phenylsemicarbazide. The desired condensation product is isolated from the methyl-alcoholic solution and fractionated in a short-way distillation apparatus. Pure 1-methoxy - 3,7 - dimethyl - 6 - hydroxy-9-cyclohexenyl-nonadiene-(2,7)-yne-(4) distils over at 145° C. and at a pressure of $10^{-4}$ mm. Hg. The yield, calculated for the aldehyde, amounts to 80-90 per cent.

10 parts by weight of the condensation product are now dissolved in 200 parts by volume of toluene, heating is applied in an inert atmosphere to 100° C. and, in the course of 10 minutes, a solution of 0.15 part by weight of iodine in 50 parts by volume of toluene is added. It is of advantage to add, before the reaction takes place, 0.05 part by weight of tocopherol to serve as anti-oxidant. Stirring is continued for 20 minutes at 100° C., the product is allowed to cool, washed with sodium-thiosulphate solution and concentrated in vacuo. The residue is divided between petroleum ether of boiling point 30–60° C. and 95 per cent. methyl alcohol. Thereby, the dehydration products (about 7 parts by weight) are dissolved in the petroleum ether, while unchanged starting material (about 3 parts by weight) passes into the 95 per cent. methyl alcohol. The part which is soluble in methyl alcohol is isolated in the usual manner and again reacted in exactly the same manner with iodine in boiling toluene. The petroleum ether solution, which contains the dehydration products, is washed with water, dried with sodium sulphate and evaporated.

5 parts by weight of the product thus obtained are dissolved in 50 parts by volume of methyl alcohol and hydrogenated, 2 parts by weight of 4 per cent. palladium-charcoal onto which 1 part by weight of quinoline has been adsorbed before use being used as catalyst. After a little less than 1 mol of hydrogen has been taken up, the hydrogenation is interrupted, the catalyst filtered off by suction and the filtrate concentrated.

The purification of the 10 per cent. vitamin-A-methyl-ether can, for instance, be effected in a percolation chromatogram through columns with aluminum oxide of low activity by means of petroleum ether of boiling point 60–80° C. Thereby, intermediate products with a free hydroxy group adhere to the aluminum oxide, whereas by-products absorbing light of lower wave lengths (280–290 m$\mu$) are less adsorbed and get enriched in the first runnings. The vitamin-A-methyl-ether itself passes slowly through the column, whereby its position can easily be detected by the intensive, yellowish-green fluorescence in the ultraviolet light. The good fraction is characterised by the stability of the Carr-Price-colour reaction and the high refraction of the residue thereof. The vitamin A-methyl-ether thus purified is a yellow oil which boils at 90–95° C./$10^{-5}$ mm. The compound shows the characteristic absorption spectrum of vitamin A with a maximum at 328 m$\mu$; biologically it is highly active.

*Example 2*

4.5 parts by weight of 1-methoxy-3-methyl-pentene-(2)-yne-(4) in 10 parts by volume of ether are added in the course of ½ hour, in a nitrogen atmosphere while stirring, to an ethyl-magnesium-bromide solution, which was prepared from 1 part by weight of magnesium chips and 4.6 parts by weight of ethyl bromide in the presence of 20 parts by volume of ether. Thereupon, the mixture is boiled under reflux for 2 hours, left to cool down, and a solution of 6 parts by weight of 4-trimethyl-cyclohexenyl-2-methyl-butene-(2)-al-(1) in 12 parts by volume of ether is added in the course of ½ hour. The mixture is stirred for 2 hours at room temperature, whereupon it is refluxed for 2 hours. It is left to cool down and the clear solution is poured into a mixture of 10 parts by weight of ammonium chloride and 50 parts by weight of ice. The hydrolised condensation product is taken up in ether, washed with water and dried with sodium sulphate, the solvent is evaporated and the residue fractionated. 8 parts by weight of 1-methoxy-3,7-dimethyl-6-hydroxy-9-trimethyl-cyclohexenyl-nonadiene-(2,7)-yne-(4) of boiling point 161–163° C. under a pressure of 0.05 mm. Hg are obtained.

8 parts by weight of this compound are boiled under reflux in 200 parts by volume of petroleum ether of boiling point 80–110° C. while introducing nitrogen and while stirring. In the course of 10 minutes a solution of 0.15 part by weight of iodine in 50 parts by volume of petroleum ether (boiling point 80–110° C.) is added. Stirring is applied for another 20 minutes under reflux, the product allowed to cool, the petroleum-ether solution washed with sodium-thiosulphate solution and concentrated in vacuo. The residue is distilled in a molecular still at $10^{-5}$ mm. and then hydrogenated in methyl-alcoholic solution as described in Example 1, and purified in case of need.

This application is a continuation-in-part of my co-pending applications Serial Nos. 703,483 and 703,484, filed October 16, 1946.

I claim:

1. A process which comprises treating a member secured from the group consisting of alkyl, aryl and aralkyl 1-ethers of 1-hydroxy-3,7-dimethyl- 6 -hydroxy-9-trimethyl-cyclohexenyl - nonadiene-(2,7)-yne-(4) with a minor amount of iodine to effect molecular rearrangement and dehydration to the corresponding 1-ether of 1-hydroxy-3,7-dimethyl-9-trimethyl-cyclohexen-yl-nonatriene-(2,6,8)-yne-(4).

2. A process according to claim 1, in which the ether is 1-methoxy-3,7-dimethyl-6-hydroxy-9-[2',6',6'-trimethyl-cyclohexene-(1')-yl]-nonadiene-(2,7)-yne-(4).

3. A process according to claim 1 carried out in the presence of inert solvent.

4. A process according to claim 1 in the presence of toluene.

5. A process according to claim 1 carried out in the presence of petroleum ether.

6. A process according to claim 1 which includes the subsequent step of hydrogenating the triene-yne to vitamin A ether.

OTTO ISLER.

REFERENCES CITED

The following references are of record in the file of this patent:

UNITED STATES PATENTS

| Number | Name | Date |
|---|---|---|
| 1,691,066 | Humphrey | Nov. 13, 1928 |
| 2,412,465 | Milas | Dec. 10, 1946 |

FOREIGN PATENTS

| Number | Country | Date |
|---|---|---|
| 560,081 | Great Britain | Mar. 20, 1944 |

OTHER REFERENCES

Heilbron et al.: "Jour. Chem. Soc.," London (1942), pages 727–737.

Milas: "Science," vol. 103 (1946), pages 581–583.

Newman et al.: "Journal Organic Chem.," vol. 9 (1944), pages 221–225.